United States Patent
Bergstrand

(10) Patent No.: US 7,184,159 B2
(45) Date of Patent: Feb. 27, 2007

(54) ARCHITECTURE FOR PRINTING VIA THE INTERNET

(75) Inventor: John Troy Bergstrand, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 830 days.

(21) Appl. No.: 10/205,187

(22) Filed: Jul. 24, 2002

(65) Prior Publication Data

US 2004/0019580 A1    Jan. 29, 2004

(51) Int. Cl.
*G06F 3/12* (2006.01)
(52) U.S. Cl. .................... 358/1.15; 358/1.13; 358/442; 709/203; 709/246
(58) Field of Classification Search ............... 358/1.13, 358/1.15, 442; 709/246
See application file for complete search history.

(56) References Cited

U.S. PATENT DOCUMENTS

| 6,476,938 | B1 * | 11/2002 | Soga ........................... 358/442 |
| 6,535,295 | B1 * | 3/2003 | Brossman et al. .......... 358/1.15 |
| 7,023,566 | B2 * | 4/2006 | Yegnanarayanan .......... 358/1.1 |
| 2002/0126306 | A1 * | 9/2002 | Chohsa et al. ............. 358/1.13 |
| 2002/0186393 | A1 * | 12/2002 | Pochuev et al. ........... 358/1.13 |
| 2004/0073708 | A1 * | 4/2004 | Warnock .................... 709/246 |

\* cited by examiner

*Primary Examiner*—Twyler Lamb
*Assistant Examiner*—Benjamin O. Dulaney
(74) *Attorney, Agent, or Firm*—Nathan R. Rieth

(57) ABSTRACT

A system including a client computer, a printer, and a translation server provides for printing from the client computer using Internet-based translation services. The system effectively transfers printer driver functions and associated resource requirements off of client computers. Advantages of the disclosed system and methods include reduced costs associated with the development of printer drivers for new printers and new versions of operating systems.

10 Claims, 5 Drawing Sheets

ARCHITECTURE FOR PRINTING VIA THE INTERNET

TECHNICAL FIELD

The present disclosure relates to printing, and more particularly, to printing documents from a networked computing environment using an Internet-based translation service for document conversions.

BACKGROUND

In a typical computing environment, before documents are sent to a printer for printing they are converted into a printer-ready format by a printer driver executing on a computer. For example, users generally work within an application program on a computer to generate or acquire a document or application file. The application program typically permits the user to view the document, manipulate its content, and print the document by selecting a print command. Selecting the print command cues the application program to initiate the print services of the operating system. The print services present a user interface in the form of a print dialog box that allows the user to select various print options prior to printing the document. When the user selects the print option within the print dialog, the application program uses a particular operating system API (application programming interface) to "draw" the document. The operating system collects the drawing commands and uses the printer driver to convert them to a PDL (page description language) format that is specific to the printer. The printer driver then directs the PDL to the printer where it is rendered as hardcopy output.

Although the above process is functional, there are several disadvantages associated with the printer driver. Most operating systems come with various types of printer drivers for the most common types of printers. When a particular driver is installed, the associated printer can be used. One problem is that each printer driver is closely associated with the operating system because the imaging system API used by an application to "draw" a document or application file is particular to the operating system. Therefore, a specific printer driver must be developed for each printer (or closely associated group of printers) to function with the various operating system platforms (e.g., Macintosh, Windows, Linux). Thus, a single printer requires the development of as many printer drivers as there are operating systems with which the printer must function. Costs associated with developing numerous printer drivers for each new printer are significant.

Another disadvantage related to the specific nature of printer drivers is their consumption of computing resources. Operating systems must include an ever-increasing number of printer drivers to accommodate the various types of printers. Maintaining the numerous printer drivers on a computer can consume valuable memory resources on the computer. In addition, executing printer drivers consumes valuable computer processing resources. Furthermore, if an operating system does not support or include a particular printer driver, the printer driver is typically available for downloading and installation from various locations on the Internet. However, this takes time, effort, and usually a little more know-how than an average user possesses.

Yet another disadvantage associated with operating system specific printer drivers is that they are typically activated by a print command from within an application program. Thus, in order for a user to print an application file associated with a particular application program, the application program must be installed on the user's computer. Therefore, users are not typically able to locate particular application files and generate a hardcopy documents if a copy of the associated application program used to create the application files is not resident on the user's computer.

Accordingly, the need exists for a way to print application files from computers that does not involve the use of operating system specific printer drivers installed on every computer.

SUMMARY

A system including a client computer, a printer, and a translation server provides for printing from the client computer without the use of an operating system specific printer driver. The computer sends an application file in its native application format to a printer. The printer locates a translation server capable of converting the application file into a format that is friendly to the printer. The printer transfers the application file in its native format to the translation server, which converts the file and returns it in the printer-friendly format.

In a particular embodiment, a computer user initiates a printing process by activating a Web browser and sending a print request to a target printer located at a URI (uniform resource identifier) address. The target printer responds by returning a print dialog program module configured to execute on the computer. Through a print dialog interface, the user indicates a desired application file for printing and various related print instructions, such as the desired number of copies to be printed. The application file is sent in its native application format, along with the print instructions, to the target printer. The target printer broadcasts a translation request to locate a translation server capable of translating the file from its native format into a printer-friendly format. When a capable translation server is found, the target printer sends the file to the server. The server converts the file into a printer-friendly format and returns it to the printer. The printer then renders the converted file as hardcopy output according to the print instructions.

In another embodiment, a computer user activates a print command from within an application program in order to print an application file. The operating system initiates a print transfer/instruction module that presents a print dialog interface allowing the user to indicate a target printer and various print instructions for the application file. The application file is sent in its native application format, along with the print instructions, to the target printer. The target printer then processes the application file as discussed in the above described embodiment.

BRIEF DESCRIPTION OF THE DRAWINGS

The same reference numbers are used throughout the drawings to reference like components and features.

DETAILED DESCRIPTION

A system including a client computer, a printer, and a translation server provides for printing from the client computer using an Internet-based translation service. The system effectively transfers printer driver functions and their associated resource requirements off of client computers. Advantages of the disclosed system and methods include reduced costs associated with the development of printer drivers for new printers and new versions of operating systems.

Exemplary System Environment for Printing Via the Internet

Figure 1:
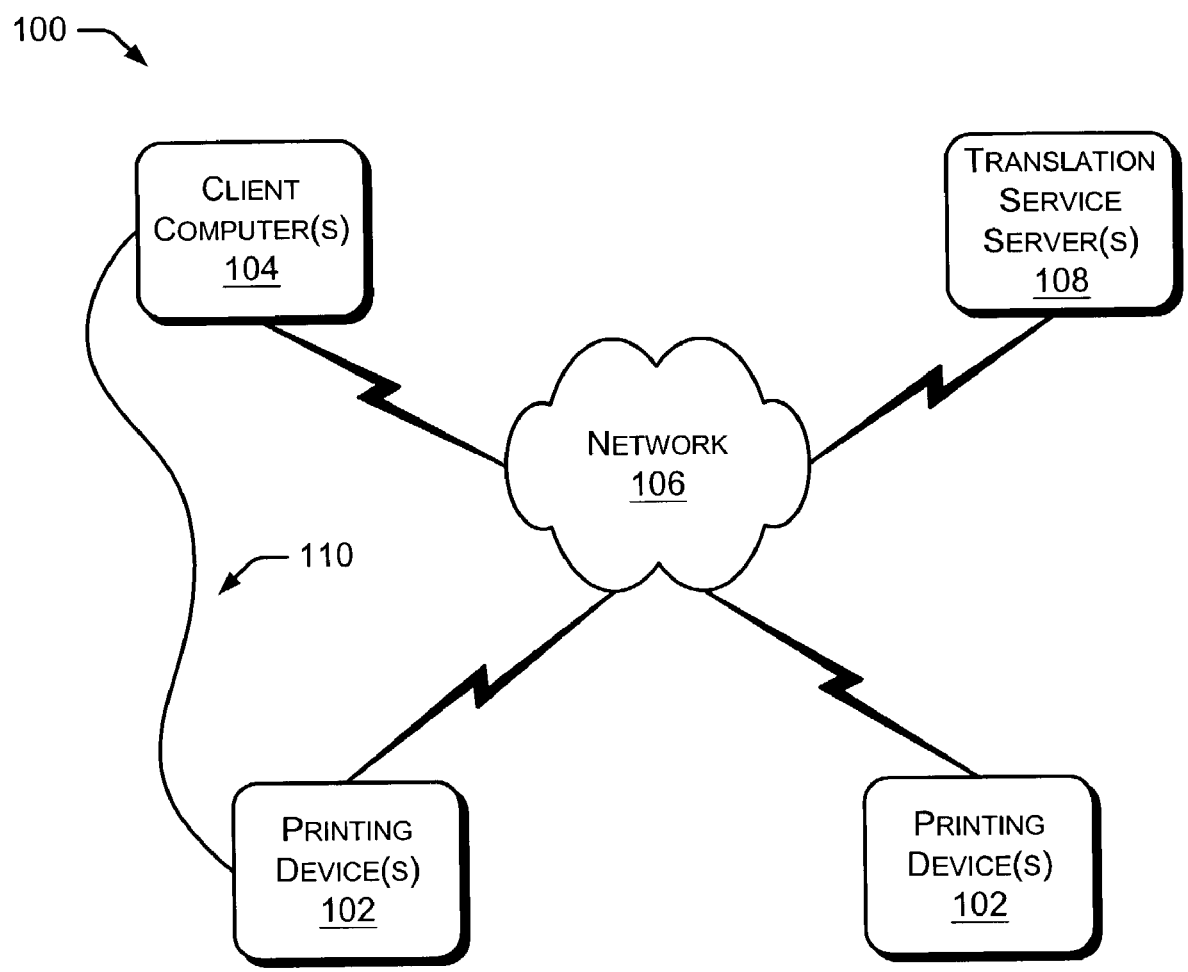
FIG. 1 illustrates a system environment that is suitable for printing via the Internet.

FIG. 1 illustrates an exemplary system environment that is suitable for printing from a client computer using a translation service available on the Internet. The exemplary system environment 100 of FIG. 1 includes printing device(s) 102 operatively coupled to client computer(s) 104 through a network connection 106. Printing device(s) 102 may also be coupled to client computer(s) 104 through a direct connection 110 such as a printer cable. In addition, the system environment 100 includes one or more translation service servers 108 accessible by printing device(s) 102 and client computer(s) 104 through network 106. The network connection 106 can include, for example, a LAN (local area networks), a WAN (wide area networks), an intranet, the Internet, or any other suitable communication link.

This disclosure is applicable to various types of printing devices 102 (printers) capable of rendering PDL (page description language) data in printed form on a print medium, such as printing pixels on paper. Therefore, printing device 102 can include devices such as laser-based printers, ink-based printers, dot matrix printers, dry toner printers, plotters and the like. In addition, printing device 102 can include various multi-function peripheral (MFP) devices that combine a printing function with other functions such as faxing, scanning, copying and the like.

Client computer 104 can be implemented as a variety of general purpose computing devices including, for example, a personal computer (PC), a laptop computer, a palmtop computer, a Macintosh, a workstation computer, and other devices configured to communicate with printer 102. Client computer 104 typically provides a user with the ability to manipulate or otherwise prepare in electronic form, an image or document to be rendered as an image that is printed or otherwise formed onto a print medium by printer 102 after transmission over network 106 or direct connection 108. As discussed more fully below regarding particular embodiments, client computer 104 outputs client data to printer 102 in an application-specific format. Printer 102 has the application-specific formatted data translated into a printer-friendly PDL (page description language) format, such as PCL or PostScript via a translation server 108. Printing device 102 processes the PDL and renders it as hardcopy output onto an appropriate recording media, such as paper or transparencies.

Translation server(s) 108 are generally available on the Internet through various translation services such as File-Merlin (http://www.acii.com/fmn.htm), WordPort (http://www.acii.com/wpt.htm), ImageMAKER (http://www.acii-.com/wpt.htm), KeyView (http://www.verity.com/keyview/), and eDoc Publish (http://www.edocpublish.com/pdf.htm). Translation server(s) 108 are typically implemented as a variety of general purpose computing devices such as a workstation computers or Web servers. Translation server(s) 108 provide a translation service capable of converting application-specific data into a printer-friendly PDL format.

Exemplary System Embodiments for Printing Via the Internet

Figure 2:
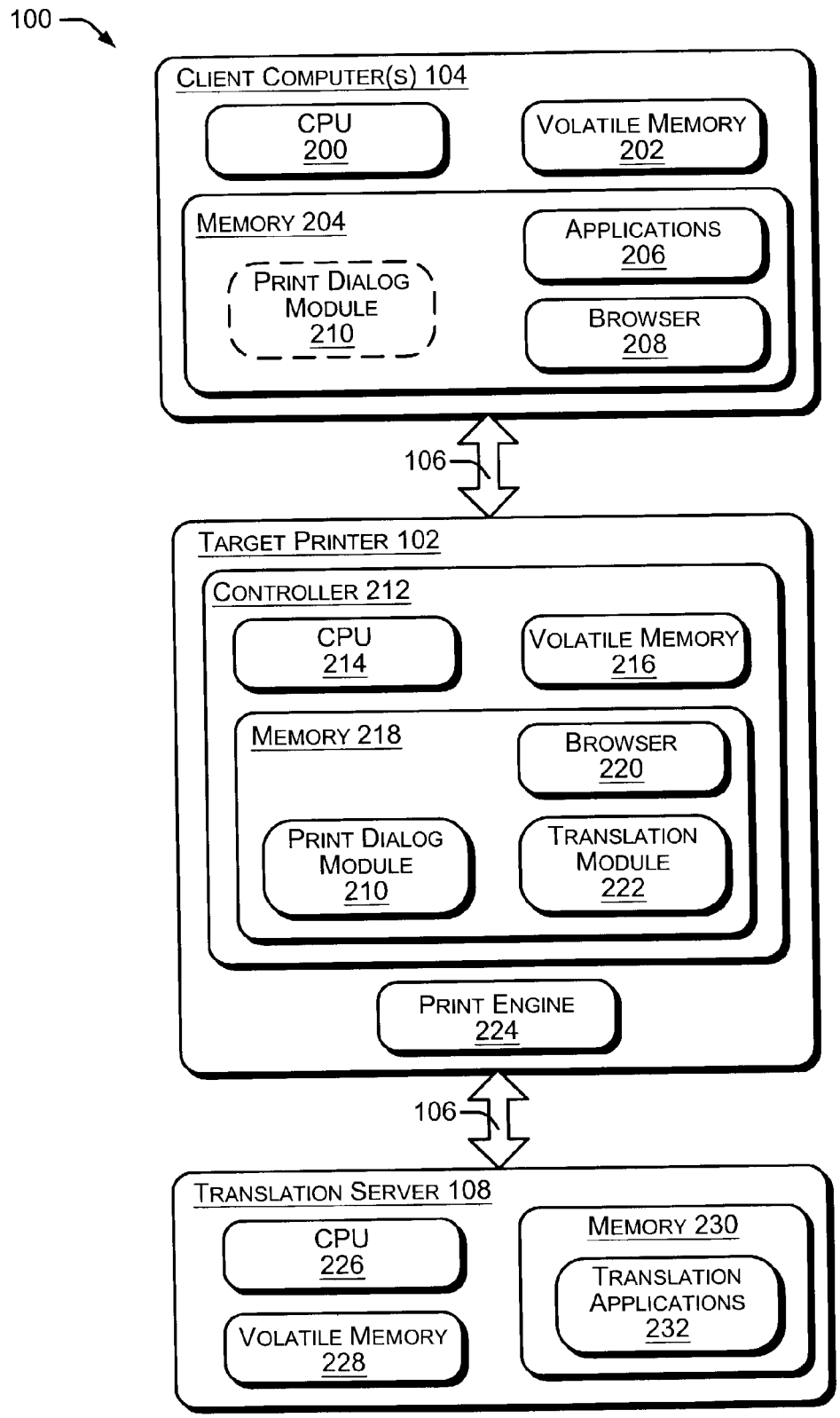
FIG. 2 is a block diagram illustrating in greater detail, an exemplary embodiment of a client computer, a printer, and a translation server such as those shown in FIG. 1.

FIG. 2 is a block diagram illustrating a particular embodiment of a client computer 104, a target printer 102, and a translation server 108 as might be implemented in the system environment 100 of FIG. 1. Client computer 104 typically includes a processor 200, a volatile memory 202 (i.e., RAM), and a nonvolatile memory 204 (e.g., ROM, hard disk, floppy disk, CD-ROM, etc.). Nonvolatile memory 204 generally provides storage of computer/processor-readable instructions, data structures, program modules and other data for client device 104. Client computer 104 may implement various application programs 206 stored in memory 204 and executable on processor 200 to create a document or image (e.g., text and graphics) on a computer screen that is transferable over network connection 106 to printer 102 for rendering as hardcopy output of the document/image. Such applications 206 might include software programs implementing, for example, word processors, spread sheets, multimedia players, illustrators, computer-aided design tools and the like.

Memory 204 additionally includes browser application 208 and a copy of a print dialog module 210. Print dialog module 210 is drawn with a broken line to illustrate that it is a copy of a print dialog module 210 received from target printer 102 residing in memory 204 on a temporary basis upon transfer from target printer 102. As discussed more fully below, browser application 208 and print dialog module 210 are generally configured to facilitate the transfer of application files and print instructions from client computer 104 to target printer 102.

Target printer 102 includes controller 212 that, in general, processes data from client computer 104 to control the output of the printer 102 through printer engine 224. The controller 212 typically includes a data processing unit or CPU 214, a volatile memory 216 (i.e., RAM), and a nonvolatile memory 218. Nonvolatile memory 218 can include various computer storage media such as ROM, flash memory, a hard disk, a removable floppy disk, a removable optical disk and the like. Nonvolatile memory 218 generally provides storage of computer/processor-readable instructions, data structures, program modules and other data for printer 102. Accordingly, memory 218 includes browser 220, translation module 222, and print dialog module 210, configured generally to facilitate the transfer, conversion, and rendering of application files from client computer 104 as discussed more fully herein below.

Translation server 108 typically includes a processor 226, a volatile memory 228, and a nonvolatile memory 230. Memory 230 includes translation application(s) 232 configured to execute on processor 226 for the purpose of translating or converting application files from a native application format into a PDL format that is compatible with target printer 102.

As mentioned briefly above, client computer 104 includes browser application 208. Browser 208 is configured, among other things, to permit a user to initiate a printing process by selecting a target printer 102 from various available printers located at various URI (uniform resource identifier) addresses across network 106. Through browser 208, a user can send a print request to a target printer at a particular URI address. The client computer 104 receives a copy of a print dialog module 210 in response to the print request which it stores in memory 204 and executes on processor 200.

Print dialog program module 210 is configured to generate a print dialog user interface on client computer 104 through which a user can enter information regarding the print request. The print dialog module 210 is programmed in an interpretative or scripting language such as Java, Perl, Python, Visual Basic, or C-Sharp. Such languages are conducive to distributed environments such as the system environment 100 of FIG. 1 based on their portability and easy execution via bytecode interpreters or virtual machines (not shown in FIG. 2). Interpreters or virtual machines are programs configured to execute interpretative languages such as Java, Perl, Python, Visual Basic, or C-Sharp. The execution of such interpretive languages through interpreters/virtual machines is generally well-known in the art.

The print dialog created by print dialog module 210 permits the user to select an application file for printing. The application file may be a file associated with an application program 206 located in memory 204, or it may be an application file for which the client computer 104 has no associated application program 206. Furthermore, the application file may be a file located on a remote computer accessible over network 106 that is downloadable to client computer 104 using browser 208. In any event, the user selects the desired application file using the print dialog. In addition, the user can select various print instructions indicating options for printing the application file. These instructions may include, for example, the number of copies of the application file to be printed or the type of media to be used to print the application file.

The print dialog module 210 is further configured to transfer the application file and the print instructions from the client computer 104 to the target printer 102 when a print option within the print dialog is selected. Once the transfer is complete, the print dialog module 210 is cleared from memory 204 on client computer 104.

The print dialog module 210 transfers the application file to target printer 102 in its native application format. That is, there is not an operating system-specific printer driver compatible with target printer 102 located on client computer 104. Such drivers are typically employed to convert an application file from its native application format into a printer-friendly PDL format prior to transferring the file to a printer. However, this disclosure describes systems and methods whereby application files are converted from their native application formats into printer-friendly PDL formats that do not require the use of such operating system-specific and printer-specific drivers. The conversions take place on a translation server 108 accessible via the Internet/network 106.

Although the print dialog module 210 has been described as an executable file that is transferred to client computer 104 for execution on processor 200, it might also be a non-executable file (e.g., an XML description document) that includes information describing the kinds of features supported by the target printer 102. In this scenario, the operating system on client computer 104 interprets the print dialog module 210 information to generate a user interface through which user-selected printing parameters and the application file are transferred to the target printer 102.

Also briefly mentioned above, controller 212 of target printer 102 includes browser 220, translation module 222, and print dialog module 210, configured generally to facilitate the transfer, conversion, and rendering of application files from client computer 104. Translation module 222 is configured to receive a print request from client computer 104 and respond by transferring a copy of print dialog module 210 to client computer 104.

As described above, print dialog module 210 executes on client computer 104 to transfer an application file in a native application format and print instructions to target printer 102. Translation module 222 then initiates browser 220 and broadcasts a translation request to various translation services located at various URL (uniform resource locator) addresses on the Internet/network 106 using browser 220. The translation request identifies the native application format of the application file and the PDL format into which the application file needs to be converted. The translation request might also include some printer-specific data (e.g., proprietary color manipulation functions) for use in the translation process. When an affirmative response is received from a translation server 108 indicating the translation server 108 can accomplish the requested conversion, the translation module 222 (via browser 220) uploads the application file in the native application format to the translation server 108.

The translation server 108, typically through a translation application 232 executing on processor 226, converts the application file from its native application format into the appropriate printer-friendly PDL (e.g., PCL, PostScript) and transfers the converted application file back to the target printer. Target printer 102 then processes the printer-friendly PDL and renders it according to the received print instructions as hardcopy output onto an appropriate recording media, such as paper or transparencies.

Figure 3:
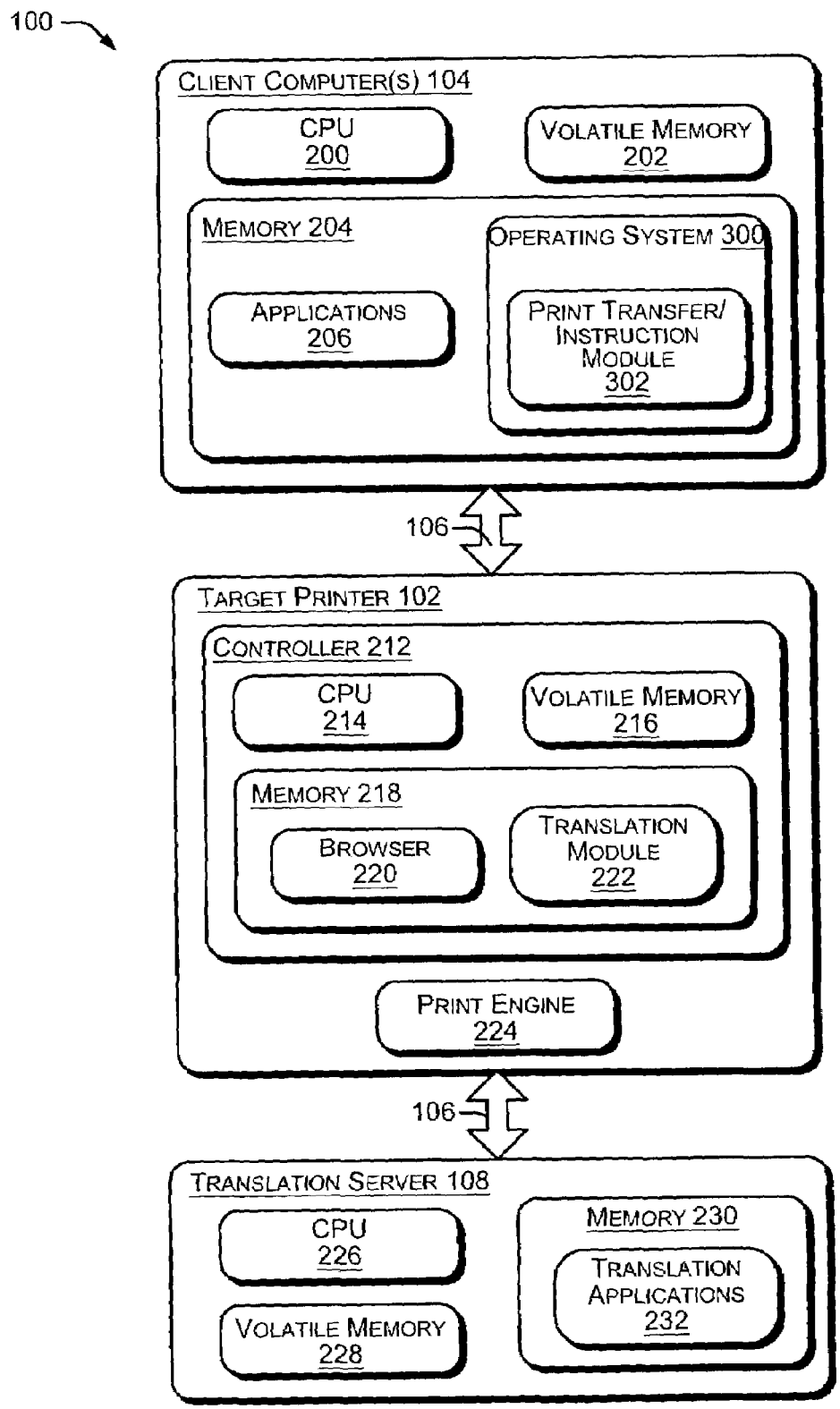
FIG. 3 is a block diagram illustrating in greater detail, an alternative exemplary embodiment of a client computer, a printer, and a translation server such as those shown in FIG. 1.

FIG. 3 is a block diagram illustrating an additional exemplary embodiment of a client computer 104, a target printer 102, and a translation server 108 as might be implemented in the system environment 100 of FIG. 1. Client computer 104 is configured in essentially the same manner as discussed above regarding the FIG. 2 embodiment, except that memory 204 includes a print transfer/instruction module 302 incorporated into an operating system 300 rather than a print dialog program module. In addition, memory 204 does not explicitly illustrate a browser application, although a browser may be included within application programs 206.

Target printer 102 is also configured in essentially the same manner as discussed above regarding the FIG. 2 embodiment, except that memory 218 does not include the print dialog program module. Translation server 108 is generally the same as described above regarding the FIG. 2 embodiment.

In the FIG. 3 embodiment, a print command activated from within an application program 206 cues the application program 206 to initiate the print services of the operating system 300. The operating system 300 initiates the print transfer/instruction module 302 which is configured to provide a generic print dialog interface similar to that described for the FIG. 2 embodiment. The print transfer/instruction module 302 allows for the entry of information identifying a target printer 102. The application file to be printed is already defined for the print transfer/instruction module 302 based on the print command activated from within the application program 206. Various print instructions, such as the number of copies of the application file to be printed or the type of paper to be used to print the application file, can also be entered through the print dialog interface.

The print transfer/instruction module 302 is further configured to transfer the application file and the print instructions from the client computer 104 to the target printer 102 when a print option within the print dialog is selected. Like the print dialog module 210 of FIG. 2, the print transfer/instruction module 302 transfers the application file to target printer 102 in its native application format. As in the prior embodiment, there is not an operating system-specific printer driver compatible with target printer 102 located on client computer 104 of FIG. 3. A conversion of the application file from its native application format to a printer-friendly PDL takes place, as in the prior FIG. 2 embodiment, on a translation server 108 accessible via the Internet/network 106.

As mentioned above, the target printer 102 of the FIG. 3 embodiment is configured in essentially the same manner as discussed above regarding the FIG. 2 embodiment, except that memory 218 does not include the print dialog program module. Therefore, target printer 102 functions in the same manner as described in the FIG. 2 embodiment, except that a print dialog program module is not transferred to the client computer 104. In the current FIG. 3 embodiment, the translation module 222 is configured to receive the application file in its native application format along with print instructions from the print transfer/instruction module 302 on client computer 104. The translation and rendering processes proceed as described for the FIG. 2 embodiment. Thus, the translation module 222 initiates browser 220 and broadcasts a translation request to various translation services located at various URL addresses on the Internet/network 106 using browser 220. The translation request identifies the native application format of the application file and the PDL format into which the application file needs to be converted. When an affirmative response is received from a translation server 108 indicating the translation server 108 can accomplish the requested conversion, the translation module 222 (via browser 220) uploads the application file in the native application format to the translation server 108.

The translation server 108 converts the application file from its native application format into the appropriate printer-friendly PDL (e.g., PCL, PostScript) and transfers the converted application file back to the target printer. Target printer 102 then processes the printer-friendly PDL and renders it according to the received print instructions as hardcopy output onto an appropriate recording media, such as paper or transparencies.

Exemplary Methods for Printing Via the Internet

Example methods for printing via the Internet will now be described with primary reference to the flow diagrams of FIGS. 4 and 5. The methods apply generally to the exemplary embodiments discussed above with respect to FIGS. 1–3. The elements of the described methods may be performed by any appropriate means, such as by the execution of processor-readable instructions defined on a processor-readable media, such as a disk, a ROM or other such memory device.

Figure 4:
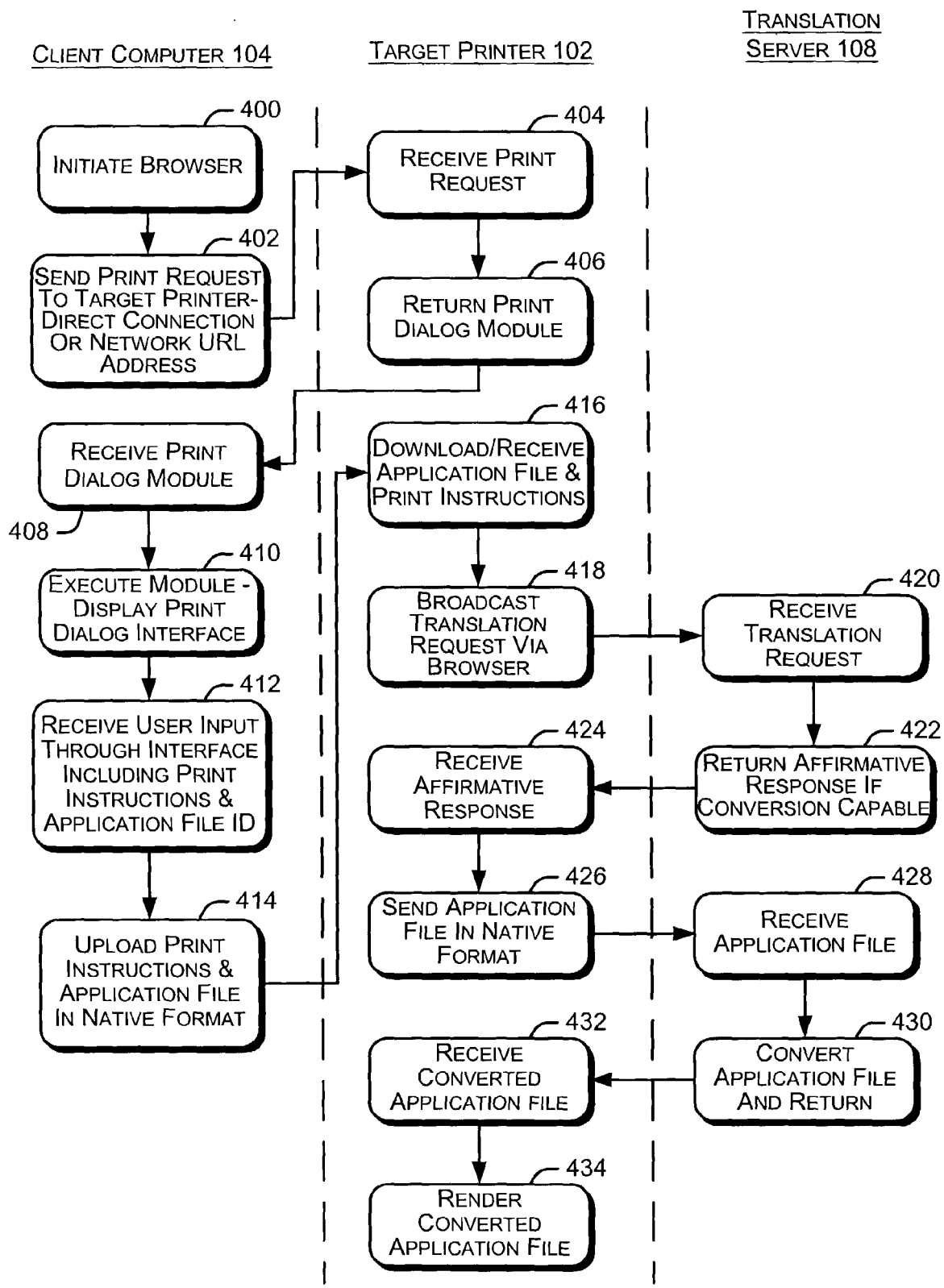
FIG. 4 is a flow diagram illustrating an example method of printing via the Internet in a system environment such as that shown in FIG. 1.

Referring to the method illustrated in FIG. 4, at block 400, a browser on a client computer is initiated. At block 402, a print request is sent to a target printer via the browser. The target printer may be directly connected to the client computer via a direct connection 110 (see FIG. 1) or it may be coupled to the client computer via network 106, in which case the print request is sent to the target printer at a network URL address.

At block 404, the target printer receives the print request and returns a print dialog program module at block 406. At block 408, the client computer receives the print dialog module and at block 410, executes the module to display a print dialog interface. At block 412, the client computer receives user input through the print dialog interface that includes print instructions and information that identifies an application file for printing. At block 414, the client computer uploads the application file in its native application format, along with the print instructions, to the target printer.

At block 416, the target printer receives or downloads the application file and print instructions. At block 418, the target printer initiates a browser and broadcasts a translation request. The translation request includes information identifying the format of the application file and the desired PDL format into which the application file should be converted.

At block 420, a translation server receives the translation request and returns an affirmative response (at block 422) to the target printer indicating the server is capable of making the requested conversion. At block 424, the target printer receives the affirmative response and at block 426, sends the application file in its native application format to the translation server to be converted. The translation server receives the application file at block 428. At block 430, the translation server converts the file into the desired printer-friendly PDL format and sends the converted file back to the target printer.

At block 432, the target printer receives the converted application file in the printer-friendly PDL format, and at block 434, renders it as hardcopy output onto a print medium.

Figure 5:
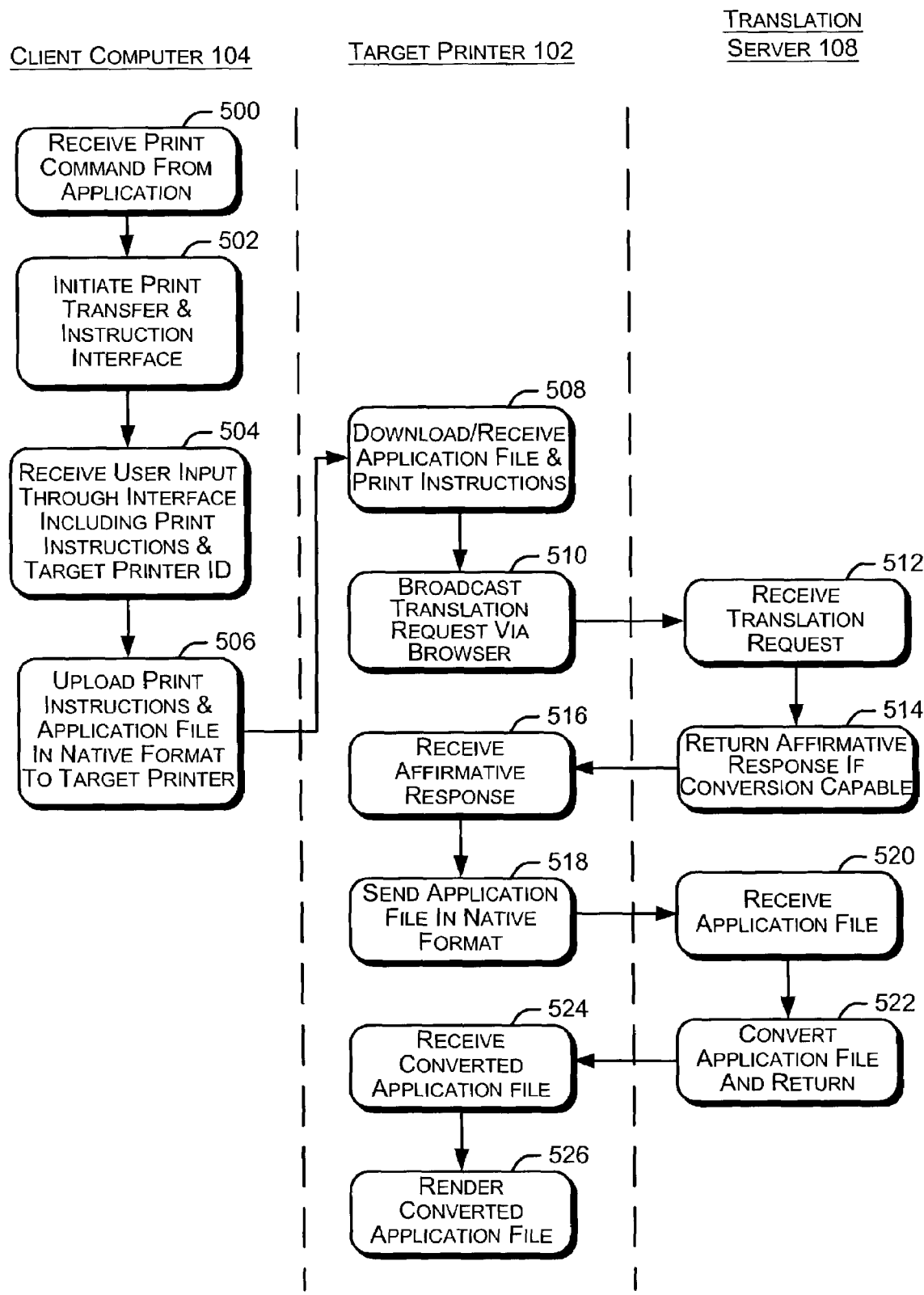
FIG. 5 is a flow diagram illustrating an alternative example method of printing via the Internet in a system environment such as that shown in FIG. 1.

Referring now to the method illustrated in FIG. 5, at block 500, the client computer receives a print command from within an application program executing on the client computer. At block 502, the client computer (through its operating system) initiates a print transfer/instruction interface. At block 504, the client computer receives user input through the print dialog interface that includes print instructions and information identifying a target printer. At block 506, the client computer uploads the application file in its native application format, along with the print instructions, to the target printer.

Continuing on at block 508, the target printer downloads or receives the application file and print instructions from the client computer. At block 510, the target printer initiates a browser and broadcasts a translation request. The translation request includes information identifying the format of the application file and the desired PDL format into which the application file should be converted.

At block 512, a translation server receives the translation request and returns an affirmative response (at block 514) to the target printer indicating the server is capable of making the requested conversion. At block 516, the target printer receives the affirmative response and at block 518, sends the application file in its native application format to the translation server to be converted. The translation server receives the application file at block 520. At block 522, the translation server converts the file into the desired printer-friendly PDL format and sends the converted file back to the target printer.

At block 524, the target printer receives the converted application file in the printer-friendly PDL format, and at block 526, renders it as hardcopy output onto a print medium.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

Additionally, while one or more methods have been disclosed by means of flow diagrams and text associated with the blocks of the flow diagrams, it is to be understood that the blocks do not necessarily have to be performed in the order in which they were presented, and that an alternative order may result in similar advantages.

The invention claimed is:

1. A processor-readable medium comprising processor-executable instructions configured for:
   receiving a print request from a computer;
   sending a print dialog program module to the computer in response to the print request;
   downloading an application file in a native application format from the computer;
   broadcasting a translation request to translate the application file from the native application format to a compatible PDL (page description language) format;
   receiving an affirmative response to the translation request from a translation service;
   sending the application file to the translation service;
   receiving a converted application file in the compatible PDL format; and
   rendering the converted application file.

2. A processor-readable medium as recited in claim 1, wherein the broadcasting further comprises:
   initiating a browser; and
   sending the translation request to a plurality of translation services at a plurality of URL (uniform resource locator) addresses using the browser.

3. A processor-readable medium as recited in claim 1, wherein the print dialog program module is programmed in an interpretive language selected from the group of languages comprising:
   Java;
   Perl (Practical Extraction and Reporting Language);
   Python;
   Visual Basic; and
   C-Sharp.

4. A processor-readable medium comprising processor-executable instructions configured for
   downloading an application file in a native application format from a computer;
   broadcasting a translation request to translate the application file from the native application format to a compatible PDL (page description language) format;
   receiving an affirmative response to the translation request from a translation service;
   sending the application file to the translation service;
   receiving a converted application file in the compatible PDL format; and
   rendering the converted application file.

5. A processor-readable medium as recited in claim 4, wherein the broadcasting further comprises:
   initiating a browser; and
   sending the translation request to a plurality of translation services at a plurality of URL (uniform resource locator) addresses using the browser.

6. A processor-readable medium as recited in claim 4, comprising further processor-executable instructions configured for initiating the downloading in response to a print request from the computer.

7. A method for printing a document comprising:
   receiving a print request from a computer;
   sending a print dialog program module to the computer in response to the print request;
   downloading an application file in a native application format from the computer;
   broadcasting a translation request to translate the application file from the native application format to a compatible PDL (page description language) format;
   receiving an affirmative response to the translation request from a translation service;
   sending the application file to the translation service;
   receiving a converted application file in the compatible PDL format; and
   rendering the converted application file.

8. A method for printing a document comprising:
   downloading an application file in a native application format from a computer;
   broadcasting a translation request to translate the application file from the native application format to a compatible PDL (page description language) format;
   receiving an affirmative response to the translation request from a translation service;
   sending the application file to the translation service;
   receiving a converted application file in the compatible PDL format; and
   rendering the converted application file.

9. A printer comprising:
   means for receiving a print request from a computer;
   means for sending a print dialog program module to the computer in response to the print request;
   means for downloading an application file in a native application format from the computer;
   means for broadcasting a translation request to translate the application file from the native application format to a compatible PDL (page description language) format
   means for receiving an affirmative response to the translation request from a translation service;
   means for sending the application file to the translation service;
   means for receiving a converted application file in the compatible PDL format; and
   means for rendering the converted application file.

10. A printer comprising:
    means for downloading an application file in a native application format from a computer;
    means for broadcasting a translation request to translate the application file from the native application format to a compatible PDL (page description language) format;
    means for receiving an affirmative response to the translation request from a translation service;
    means for sending the application file to the translation service;
    means for receiving a converted application file in the compatible PDL format; and
    means for rendering the converted application file.

* * * * *

UNITED STATES PATENT AND TRADEMARK OFFICE
CERTIFICATE OF CORRECTION

PATENT NO. : 7,184,159 B2 Page 1 of 1
APPLICATION NO. : 10/205187
DATED : February 27, 2007
INVENTOR(S) : John Troy Bergstrand It is certified that error appears in the above-identified patent and that said Letters Patent is hereby corrected as shown below:

In column 9, line 38, in Claim 4, after "for" insert -- : --.

In column 10, lines 36-37, in Claim 9, after "format" insert -- ; --.

Signed and Sealed this

Twelfth Day of May, 2009

JOHN DOLL
*Acting Director of the United States Patent and Trademark Office*